US009818453B1

United States Patent
Lapp et al.

(10) Patent No.: US 9,818,453 B1
(45) Date of Patent: Nov. 14, 2017

(54) METHODS AND DEVICES FOR SEALING HARD DRIVES

(71) Applicant: Seagate Technology LLC, Cupertino, CA (US)

(72) Inventors: David R. Lapp, Boulder, CO (US); Neal F. Gunderson, Minneapolis, MN (US); Wolfgang Rosner, Burnsville, MN (US); Robert M. Gibbs, Longmont, CO (US); Kok Chai Low, Lakeville, MN (US); Edward J. Seibert, Longmont, CO (US); David G. Fitzgerald, Lafayette, CO (US); Sonia Marrero, Longmont, CO (US); Jeffrey James Croxall, Boulder, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/152,098

(22) Filed: May 11, 2016

(51) Int. Cl.
*G11B 33/14* (2006.01)

(52) U.S. Cl.
CPC ...... *G11B 33/1406* (2013.01); *G11B 33/1486* (2013.01)

(58) Field of Classification Search
CPC .. G11B 33/14; G11B 33/1406; G11B 33/1486

USPC .......... 360/99.2, 99.21, 99.22, 99.18, 99.01, 360/99.02
See application file for complete search history.

(56) References Cited

U.S. PATENT DOCUMENTS

| | | | |
|---|---|---|---|
| 7,016,145 B2 | 3/2006 | Gunderson et al. | |
| 7,874,846 B2 | 1/2011 | Gunderson et al. | |
| 8,646,781 B2 | 2/2014 | Gunderson | |
| 9,458,936 B2 | 10/2016 | Bernett et al. | |
| 9,460,756 B1* | 10/2016 | Forbord ................. | G11B 33/14 |
| 2005/0068666 A1* | 3/2005 | Albrecht ............ | G11B 33/1466 360/99.18 |
| 2005/0169120 A1* | 8/2005 | Toyoda .................... | G11B 7/12 369/30.27 |
| 2008/0212237 A1* | 9/2008 | Uefune ................ | G11B 25/043 360/254 |
| 2008/0310048 A1* | 12/2008 | Hirono ............... | G11B 33/1466 360/97.16 |
| 2010/0214732 A1* | 8/2010 | Charles .................. | H05K 5/062 361/679.33 |
| 2015/0332733 A1* | 11/2015 | Lapp ....................... | H02K 5/12 360/99.08 |

* cited by examiner

*Primary Examiner* — Allen T Cao
(74) *Attorney, Agent, or Firm* — Faegre Baker Daniels LLP

(57) ABSTRACT

A hard drive includes a base deck with sidewalls to define a cavity. The hard drive further includes a weld lip that is positioned along and extends from the sidewalls. The weld lip includes a thermal choke that is configured to reduce heat transfer from the weld lip to the sidewalls.

12 Claims, 5 Drawing Sheets

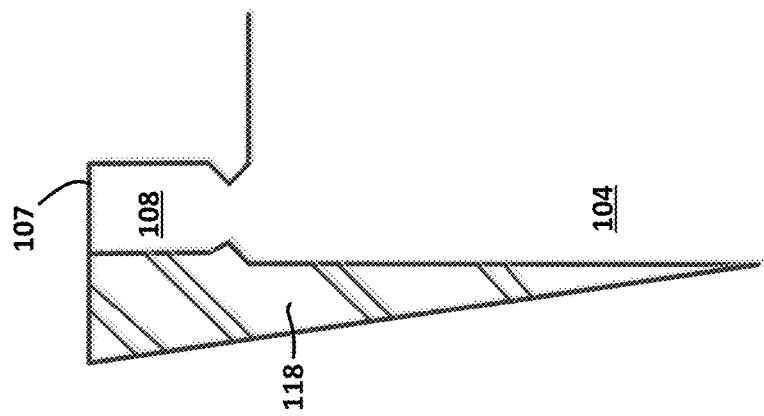
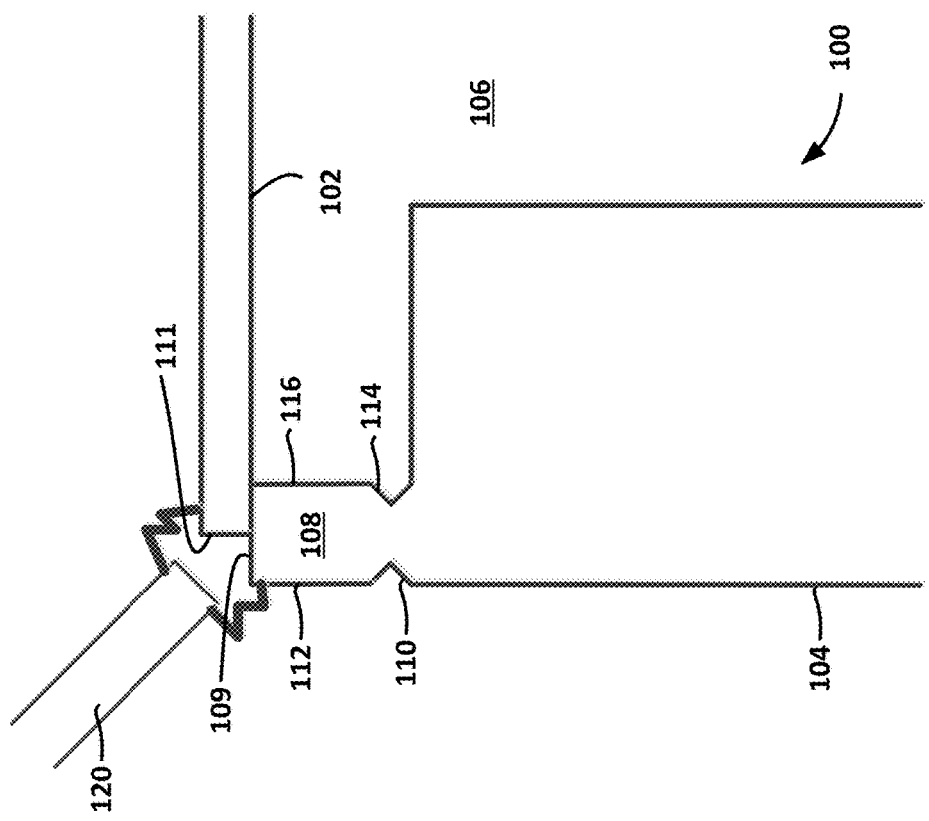
FIG. 1B
FIG. 1A

METHODS AND DEVICES FOR SEALING HARD DRIVES

SUMMARY

An apparatus includes a base deck that forms sidewalls, which define a cavity. The apparatus further includes a weld lip that is positioned along and extends from the sidewalls. The weld lip and sidewalls form a thermal choke that is configured and arranged to reduce heat transfer from the weld lip to the sidewalls.

BRIEF DESCRIPTION OF THE DRAWINGS

FIG. 1A shows a cut-away side view of a portion of a hard disc drive showing a hard drive base, a weld lip, and a cover, in accordance with certain embodiments of the present disclosure.

FIG. 1B shows a cut-away side view of a portion of a hard drive base deck and weld lip immediately after being forged, in accordance with certain embodiments of the present disclosure.

Figure 2:
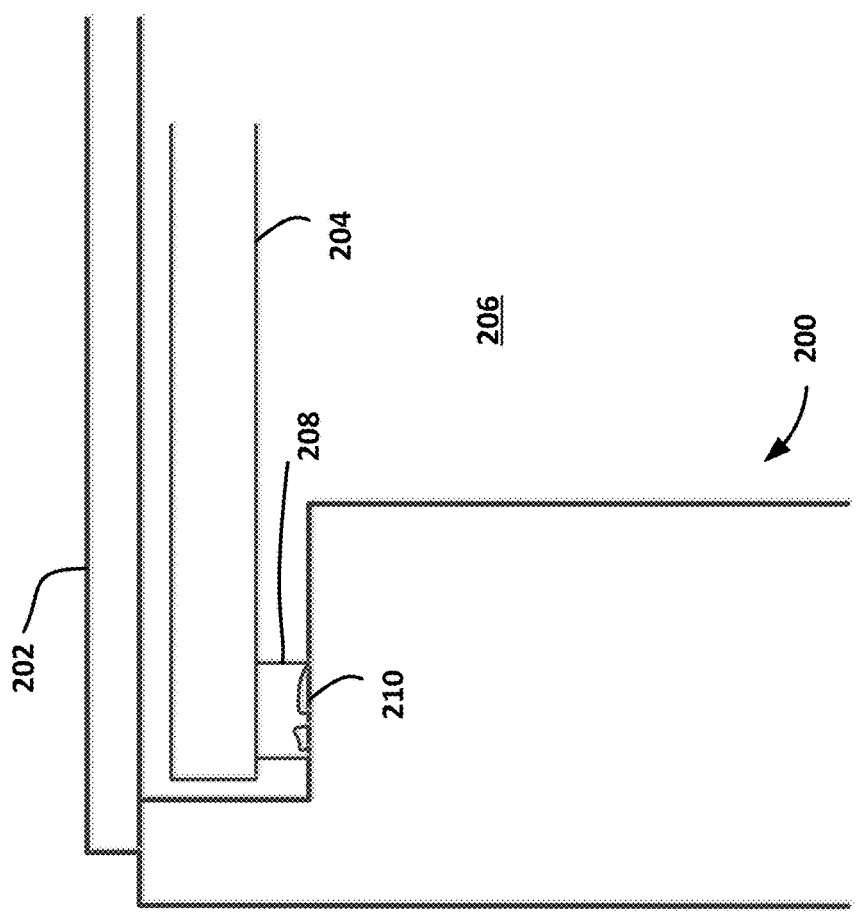
FIG. 2 shows a cut-away side view of a portion of a hard disc drive showing a hard drive base, a weld lip, a final cover, and a process cover, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the invention as defined by the claims.

DETAILED DESCRIPTION

Data storage devices like hard disc drives can be filled with air or a lower density gas, such as helium, and sealed to control and maintain a storage device's internal environment. Sealing mitigates or prevents leakage of internal gases from the storage device. One potential source of leaks in a data storage device is the interface between a base deck and cover where they are coupled together to form an enclosed internal cavity. Sealing that interface can be accomplished by various forms of welding, including laser welding. Certain embodiments of the present disclosure are accordingly directed to systems, devices, and methods for sealing data storage devices.

FIG. 1A shows a cut away side view of portion of a base deck 100 and cover 102. The base deck 100 includes side walls (e.g., side wall 104) that together with a bottom portion of the base deck (not shown in FIG. 1A), creates an internal cavity 106 that may house data storage components like magnetic recording media, read/write transducers, a spindle motor, etc. A weld lip 108 is positioned along the sidewalls 104 and extends from the sidewalls 104. The cover 102 is placed on top of the sidewalls 104 and extends partially along a top surface 107 of the weld lip 108 such that a portion 109 of the top surface of the weld lip is exposed (i.e., uncovered by the cover 102) before welding. For example, the cover 102 may have a smaller length and height than the base deck 100 such that, when centered on the base deck 100, the cover 102 does not reach the entirety of the top surface 107 of the weld lip 108. In some embodiments, an edge 111 of the cover extends to a midpoint of the top surface 107 of the weld lip 108.

The cover 102 can be welded to the weld lip 108 by, for example, laser welding, which is shown is FIG. 1A. In particular, during laser welding, a laser welding tip 120 generates a laser beam, which heats and melts the cover 102 in order to seal the cover 102 to the weld lip 108. As one of skill will appreciate, the laser beam may also or alternatively heat and melt a portion of the weld lip 108 to create a seal with the cover 102. One issue that can affect quality of a weld is when the target material or materials lose too much heat during welding. For example, the sidewalls 108 of the base deck 100 may conduct heat away from the weld lip 108—causing a temperature of the weld lip 108 to be less than desired for welding. In addition to affecting weld quality, the transferred heat may undesirably heat components of the data storage device like sealing gaskets, which may soften and develop leak paths.

To mitigate heat loss from the weld lip 108 during welding, the base deck 100 can include at least one thermal choke. In some embodiments, the thermal choke is designed to reduce heat conducted from upper portions the weld lip 108 into lower portions of the weld lip 108 and/or the base deck 100. This may be accomplished through the use of thermal choke features. FIG. 1A shows a first thermal choke feature 110 on an exterior surface 112 of the base deck 100 and a second thermal choke 114 feature on an interior surface 116 of the base deck 100. Individually and/or collectively, the thermal choke features 110, 114 reduce the amount of heat transferred from the weld lip to the rest of the base deck 100. Although FIG. 1A shows both the thermal choke features 110, 114 as triangular notches in the exterior and interior surfaces 112, 116 of the base deck 100, the inventors recognize that other shapes can be formed by or into the base deck within or near the weld lip 108 to mitigate heat loss to other portions of the base deck. For example, the thermal choke features may be semicircular, square, a flat-bottomed triangle, or rectangular among other shapes. The particular shape may be selected on manufacturability and thermal choke effectiveness. In certain embodiments, the thermal choke features are formed as channels that extend along the entirety of the interior or exterior surfaces of the base deck.

The thermal choke features may be formed by machining. For example, sidewalls 104 of a forged base deck 100 immediately after being forged may include excess material, which is shown as element 118 in FIG. 1B. Removal of the excess material may help prepare the weld lip 108 for welding. For example, exterior surfaces of base decks 100 may be at least partially covered by excess materials 118, which, if left on the weld lip 108, may degrade or contaminate a weld. Offsetting the weld lip 108 (i.e., removing the excess materials 118) may provide opportunities for texturing or additional machining of the weld lip 108 to provide a clean welding surface. During this process, the excess material 118 may be removed to form thermal choke features. In addition to machining thermal choke features, the base deck may be machined such that an exterior surface of the weld lip 108 is parallel but not in line with an exterior surface of the base deck below the thermal choke feature.

The base deck 100 can comprise materials such as aluminum alloys (e.g., 6061 aluminum alloy) or the like. The cover 102 can be formed using techniques like stamping, forging, machining, and the like and can comprise materials such as aluminum alloys (e.g., 4047 aluminum alloy) or the like.

FIG. 2 shows a cut-away view of a portion of a data storage device having a base deck 200, a final cover 202, and a process cover 204. The base deck 200 and final cover 202 can be coupled together to create a seal using methods like those described with respect to FIG. 1A. The process cover 204 may be used to seal a low-density gas, like helium, within an internal cavity 206 while the data storage device is assembled and before a seal is established by the final cover 202 and base deck 200. For example, during assembly, the internal cavity 206—which houses data storage components—may be filled initially with a low-density gas after which the data storage device is run through various tests.

The base deck 200 and process cover 204 can be coupled together to create a seal using a gasket, such as a formed-in-place gasket (FIPG), along with various fasteners to compress the gasket. FIG. 2 shows a gasket 208 compressed between the base deck 200 and process cover 204. The gasket 208 in FIG. 2 is shown as having a non-uniform interface 210 with the base deck 200. Such an interface 210 creates leak paths for gas to escape the internal cavity 206 while the data storage device is assembled and tested. The non-uniform interface 210 may be caused by irregular surface features on sidewall of the base deck 200.

Figure 3:
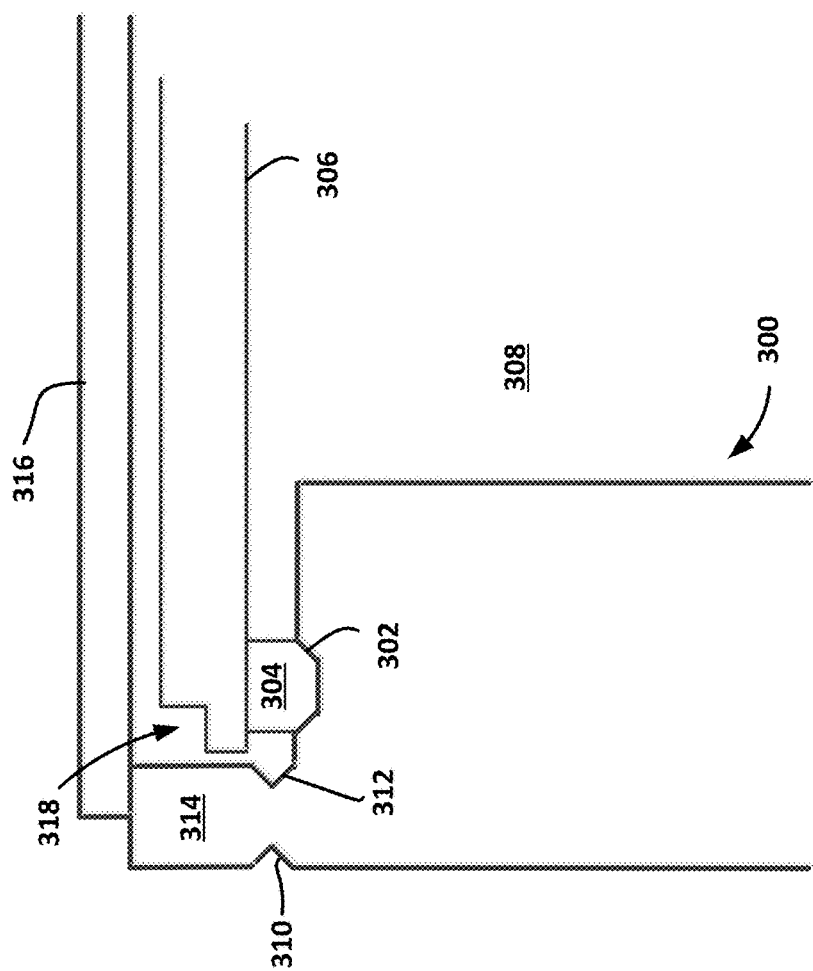
FIG. 3 shows a cut-away side view of a portion of a hard disc drive showing a process cover with an exemplary edge feature, in accordance with certain embodiments of the present disclosure.

To mitigate the effects of irregular surface features, FIG. 3 shows a base deck 300 that includes a channel 302 for receiving a gasket 304 in order to seal an internal cavity 308 defined by the base deck 300 and a process cover 306. The channel 302 provides multiple surfaces for the gasket 304 to interface with and therefore mitigates the effects of a single planar surface having surface irregularities that create a leak path for low-density gas to escape the internal cavity 308. The channel 302 can be formed by machining or may be formed during forging and can form shapes other than that shown in FIG. 3. For example, although only three surfaces are shown in FIG. 3, the channel can include more than three surfaces for the gasket to interface with. During assembly, the gasket may be applied to a surface of the process cover 306 in a liquid or semi-solid condition and then cooled.

FIG. 3 also shows the base deck 300 forming thermal choke features 310 and 312, like those shown in FIG. 1A, to mitigate heat loss during welding by reducing heat sink effects caused by the thermal mass of the base deck 300. Another potential heat-sink source is the process cover 306. For example, while a weld lip 314 of the base deck 300 and final cover 316 are being welded together, the process cover 306 may absorb heat from the weld lip 314 due to the proximity of the process cover 306 and weld lip 314.

To mitigate heat loss from the weld lip 314 to the process cover 306 during welding, the process cover 306 can include edge features 318 that reduce the volume of material of the process cover 306 near where the weld lip 318 and final cover 316 are welded together. FIG. 3 shows an exemplary edge feature 318 with a reduced thickness at an outer perimeter of the process cover 306. The inventors recognize that other types of edge features and shapes that reduce a volume of material near the weld may be used. For example, the process cover 306 may define an edge feature like a chamfer. In some embodiments, the chamfer is angled between 30 and 60 degrees. In some embodiments, the chamfer is angled at 45 degrees. The edge feature may be formed by machining the process cover, stamping the process cover, among other like processes.

Edge features may create additional space between a weld, which may permit additional weld-bead clearance for re-welding if the original weld requires an extra weld pass. Further yet, the additional space diminishes the chance that a weld contacts the process cover 306.

Figure 4:
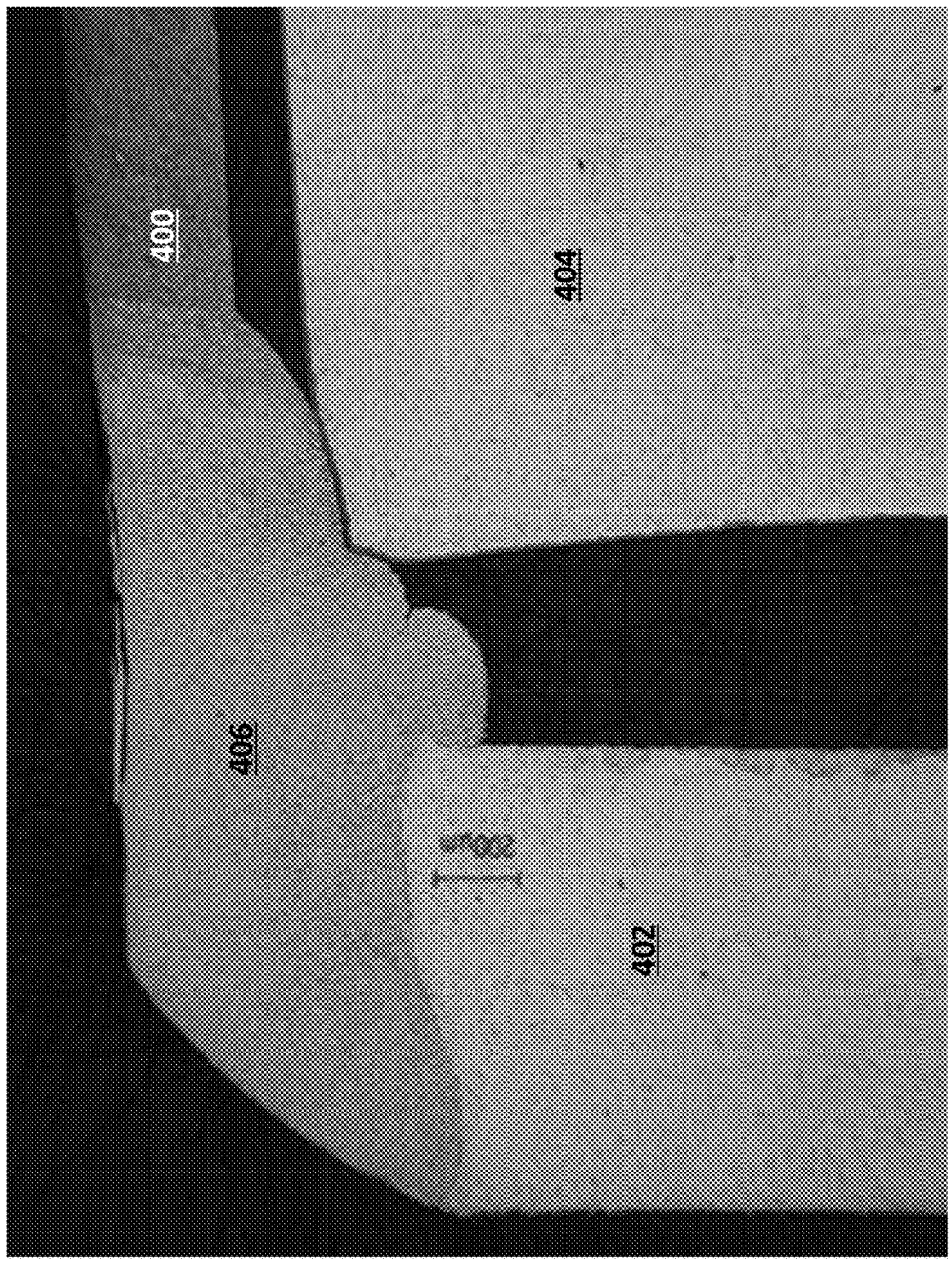
FIG. 4 shows a cross-sectional view of a portion of a welded hard drive base deck, in accordance with certain embodiments of the present disclosure.

If the weld contacts the process cover 306, that contact may lead to a suboptimal welding environment where, among other things, the process cover 306 becomes a heat sink, which can be seen in FIG. 4. In particular, FIG. 4 shows an image of a cross-section of a final cover 400 welded to a base deck weld lip 402. A process cover 404 is positioned within a cavity formed by the final cover 400 and weld lip 402. In FIG. 4, the process cover 404 does not include an edge feature like those shown and described with respect to FIG. 3. A weld bead 406 can be seen extending (e.g., drooping) into a space between weld lip 402 and process cover 404. FIG. 4 also shows that, before cooling, the weld likely contacted the process cover 404.

Figure 5:
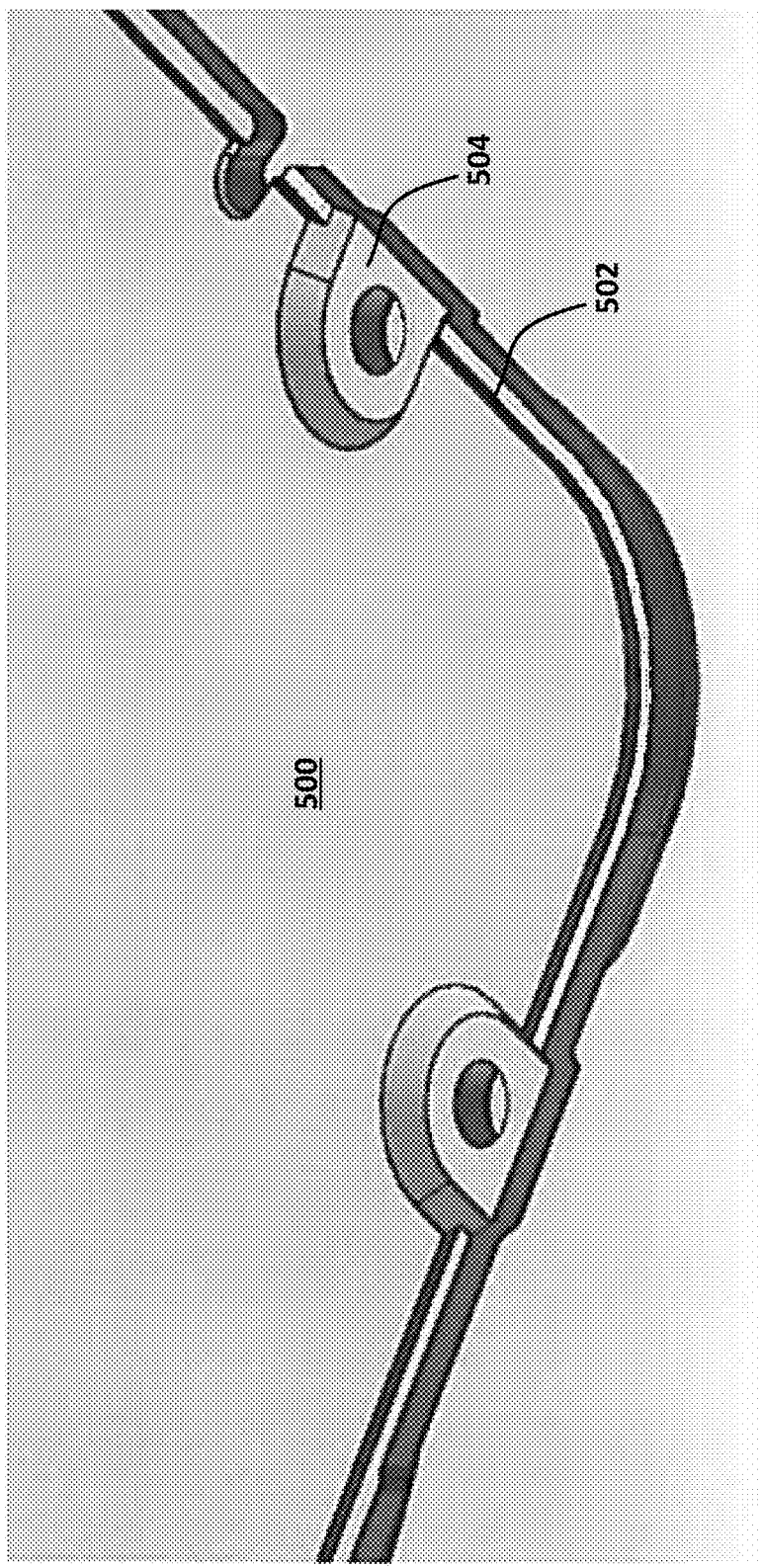
FIG. 5 shows a perspective view of a portion of a process cover, in accordance with certain embodiments of the present disclosure.

Edge features may be formed around the entire perimeter of the process cover or can be positioned only at specific areas where the process cover would normally be positioned near the weld lip. FIG. 5 shows a partial view of a process cover 500 defining an edge feature 502, which is shown as a portion of reduced thickness that extends along a perimeter of the process cover 500 on a top side of the cover. The process cover 500 also includes a reduced-thickness fastener section 504, through which fasteners are positioned to secure the process cover 500 to a base deck. As such, the edge feature 502 does not necessarily extend along the entire perimeter of the process cover 500 but extends between the reduced-thickness fastener sections 504.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A hard drive comprising:
   a base deck having sidewalls to define a cavity; and
   a weld lip positioned along and extending from the sidewalls, the weld lip including a thermal choke configured to reduce heat transfer from the weld lip to the sidewalls.

2. The hard drive of claim 1, wherein the weld lip includes an interior-facing surface and an exterior-facing surface opposite the interior-facing surface, and wherein the thermal choke includes a thermal choke feature formed on the interior-facing surface of the weld lip.

3. The hard drive of claim 2, wherein the thermal choke feature is a first thermal choke feature, wherein a second thermal choke feature is formed on the exterior-facing surface, and wherein the thermal choke includes the first and second thermal choke features.

4. The hard drive of claim 1, wherein the weld lip includes an interior-facing surface and an exterior-facing surface opposite the interior-facing surface, wherein the thermal choke includes a thermal choke feature formed on the exterior-facing surface of the weld lip.

5. The hard drive of claim 1, further comprising a final cover placed on an upper surface of the weld lip, the final cover only partially covering the upper surface of the weld lip.

6. The hard drive of claim 1, wherein the base deck includes a channel formed in an upper surface of the base deck, the channel being configured to receive a gasket.

7. The hard drive of claim 6, wherein the channel is at least partially defined by a first surface, a second surface, and a third surface, and wherein the first surface and the second surface are angled relative to the third surface.

8. The hard drive of claim 1, further comprising:
   a final cover welded to the weld lip; and
   a process cover coupled to the base deck, wherein the process cover includes a reduced-volume edge feature located along at least a portion of a perimeter of the process cover.

9. The hard drive of claim 8, wherein the reduced-volume edge feature is a chamfer.

10. The hard drive of claim 9, wherein the chamfer is angled at an angle including and between 30 to 60 degrees.

11. The hard drive of claim 1, wherein the thermal choke feature includes a channel that extends along an exterior-facing surface of the base deck.

12. A data storage device comprising:
   a base deck that includes sidewalls at least partially defining a cavity for housing data storage components;
   a weld lip positioned along and extending from the sidewalls; and
   means for reducing heat transfer from the weld lip to the sidewalls.

* * * * *